(12) United States Patent
Noelke

(10) Patent No.: US 6,827,288 B2
(45) Date of Patent: Dec. 7, 2004

(54) SPRINKLER SYSTEM WITH RELIEF AND BACKFLOW PREVENTER VALVE

(76) Inventor: Michael A. Noelke, 4443 Kerth Manor Dr., St. Louis, MO (US) 63128

( * ) Notice: Subject to any disclaimer, the term of this patent is extended or adjusted under 35 U.S.C. 154(b) by 170 days.

(21) Appl. No.: 10/099,507

(22) Filed: Mar. 15, 2002

(65) Prior Publication Data
US 2003/0173415 A1 Sep. 18, 2003

(51) Int. Cl.[7] ............ B05B 9/00; A01G 27/00; F17D 3/00
(52) U.S. Cl. ............ 239/124; 239/70; 239/DIG. 15; 137/624.11; 137/624.18
(58) Field of Search .......... 239/124, 70, DIG. 15, 239/69, 71, 207, 208, 276; 137/624.11, 624.18, 624.12, 487.5

(56) References Cited

U.S. PATENT DOCUMENTS

| | | | | |
|---|---|---|---|---|
| 2,185,394 A | * | 1/1940 | Arbogast | 239/66 |
| 3,118,606 A | * | 1/1964 | Orlo | 137/78.2 |
| 3,386,460 A | * | 6/1968 | Dean | 137/218 |
| 4,241,375 A | * | 12/1980 | Ruggles | 361/166 |
| 4,265,403 A | | 5/1981 | Bonetti | 239/66 |
| 4,340,179 A | | 7/1982 | Knapp | 239/310 |
| 4,708,162 A | * | 11/1987 | Bayat | 137/382 |
| 4,791,948 A | * | 12/1988 | Bayat | 137/1 |
| 4,834,143 A | * | 5/1989 | Bayat | 137/899 |
| 5,535,987 A | | 7/1996 | Wlodarczyk | 251/331 |
| 5,560,542 A | * | 10/1996 | Reid | 239/70 |
| 5,853,026 A | | 12/1998 | Wlodarczyk et al. | 137/613 |
| 6,248,411 B1 | * | 6/2001 | Warfel | 428/15 |

OTHER PUBLICATIONS

WaterMonster—Portable Watering Systems—printed Jun. 27, 2001.

* cited by examiner

Primary Examiner—Michael Mar
Assistant Examiner—Darren Gorman
(74) Attorney, Agent, or Firm—Polster, Lieder, Woodruff & Lucchesi, L.C.

(57) ABSTRACT

This above ground sprinkler system for a water supply provides a main supply hose having an inlet connected to the water supply and an outlet. A main valve is disposed between bib end of the hose and the water supply. A central station including a water supply inlet is connected to the main supply hose outlet and a plurality of hose outlets, each having an associated flow control valve, supplies water to sprinklers, or similar devices at the outer end of hoses which are connected at their inner ends to the outlets. A control system for directing the water supply to the individual hose outlets is provided including a timer. A relief valve is provided for draining water from the main supply hose and a backflow preventor valve is provided for preventing back-siphonage into the water supply.

18 Claims, 5 Drawing Sheets

NORMALLY CLOSED

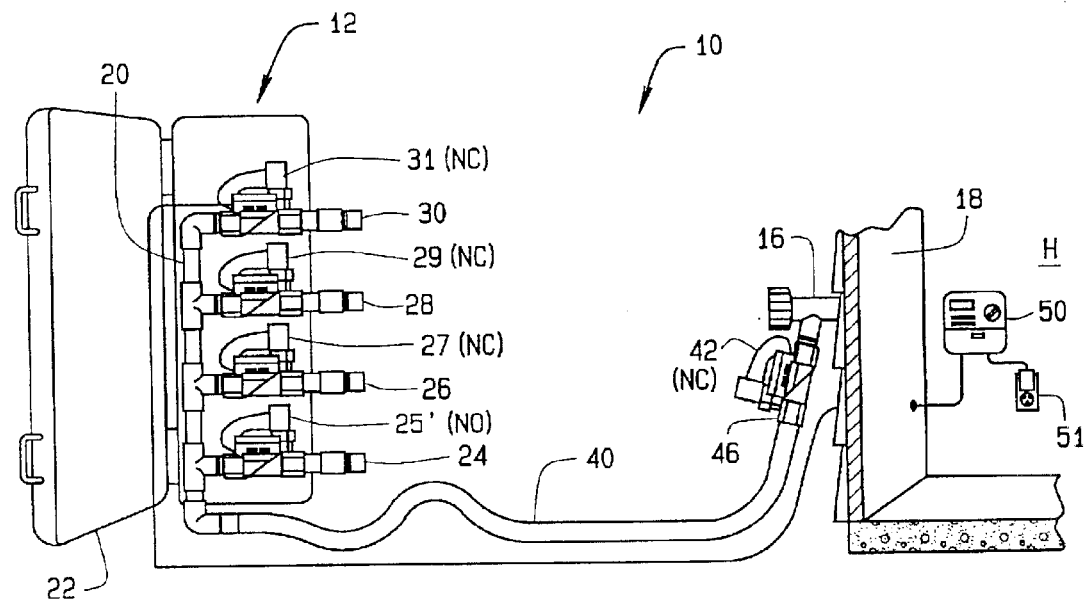
FIG. 9
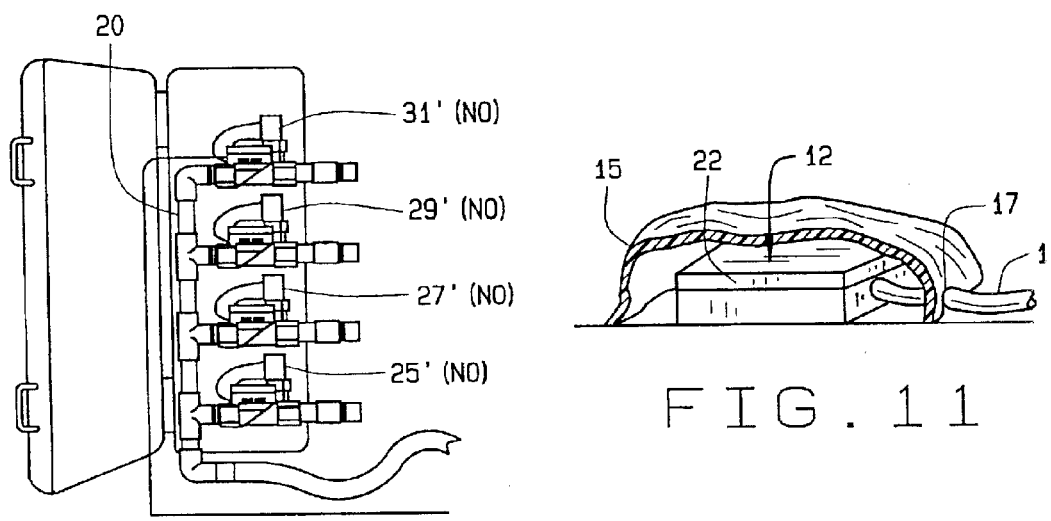
FIG. 10
FIG. 11

SPRINKLER SYSTEM WITH RELIEF AND BACKFLOW PREVENTER VALVE

BACKGROUND OF THE INVENTION

This invention relates generally to sprinkler systems and particularly to portable, above ground sprinkler systems for lawns and gardens having a main line from the water supply to the sprinkler system and a valve system for draining the main line and for preventing backflow siphonage into the water supply.

Sprinkler systems used for lawns and gardens are well-known and may be divided generally into above ground systems and below ground systems.

Above ground systems are exemplified by the system sold under the trademark WaterMonster by the company of the same name located at Lancaster, Ga. Such systems include a central unit having an inlet connected to a domestic water supply and several outlet valves each having a connection for one end of a conventional garden hose, the other end of each hose being connectible to a watering attachment. The valves are controlled by a timer so that they operate consecutively at selected time periods. Known above ground systems do not provide back-siphonage protection of supply hose drainage.

Below ground systems are exemplified by U.S. Pat. No. 4,265,403. This patent discloses a system having a plurality of sprinkler heads mounted in series and connected to a common water supply for consecutive operation by a timer. The sprinkler heads are of the pop-up type which have the advantage of being below grade when not in use which facilitates lawn mowing but below ground system lack the versatility of the above ground systems. U.S. Pat. No. 4,265,403, which is incorporated herein by reference, discloses the use of backflow preventer and each sprinkler is provided with a self-contained timer system. Below ground systems are much more elaborate than above ground systems and accordingly are much more expensive with respect to the cost of components and require professional installation.

This sprinkler system overcomes the above disadvantages in a manner not revealed in the known prior art.

SUMMARY OF THE INVENTION

This sprinkler system is a portable above ground system which provides controlled sprinkling for prescribed periods of time starting at preselected times. The system includes a relief valve which automatically opens when the watering operation is completed to drain water from the main supply line so that the main line supply hose is substantially free from pressure after the watering is complete. The system also includes a backflow prevention valve to guard against reverse flow into the water supply.

This above ground sprinkler system for a water supply provides a main supply hose with a main flow control valve, said hose having an inlet operatively connected to the water supply and an outlet. A central station is provided including a water supply inlet; operatively connected to the main supply hose outlet and a plurality of hose outlets, each having an associated flow control valve. A control system for directing the water supply to the individual hose outlets is provided including a timer. A relief valve is provided for draining the main supply hose.

It is an aspect of this invention that a backflow prevention valve is provided for preventing backflow siphonage into the water supply.

It is an aspect of this invention to provide that the central station includes a portable container housing for the flow control valves.

It is another aspect of this invention to provide that the flow control valves are normally closed, solenoid-operated valves; and the relief valve is a normally open solenoid-operated valve.

It is yet another aspect of this invention to provide a 24 volt power supply for the solenoid-operated valves.

It is still another aspect of this invention to provide that supplying power to any of the normal closed valves energizes the normally open valve.

It is an aspect of this invention to provide that the timer is remotely located from the central location and, as an alternative to provide that the timer is housed in the portable container.

It is another aspect of this invention to provide that the central station includes a cover simulating a natural object.

It is another aspect of this invention to provide that the main flow control valve is normally closed and at least one flow control valve in the central station is normally open to perform the function of the relief valve.

It is still another aspect of this invention to provide that the main flow control valve is normally closed and all other flow control valves and the relief valve are normally open.

It is yet another aspect of this invention to provide that the main flow control valve and the relief valve are energized simultaneously while the central station flow control valves are energized sequentially for normal demand watering, as controlled by the timer and all solenoid-operated valves are de-energized when watering is not required, as controlled by the timer.

It is still another aspect of this invention to provide that all solenoid-operated valves are energized except one of the central station flow control valves, which is sequentially de-energized for demand watering, as controlled by the timer and all solenoid-operated valves are de-energized when watering is not required, as controlled by the timer.

It is another aspect of this invention to provide that each solenoid-operated valve includes a plunger; and the plunger positioning of the normally closed and normally open valves is arranged to insure that the main supply hose is pressure relieved and evacuated to prevent back-siphonage in the event of power failure occur during system operation.

This sprinkler system is relatively simple to manufacture and use and is particularly efficient in operation.

BRIEF DESCRIPTION OF THE DRAWINGS

FIG. 9 shows a modified arrangement of sprinkler system solenoid-operated valves;

FIG. 10 is a schematic view, similar to FIG. 9 of another modified arrangement of the solenoid-operated valves; and FIG. 11 is a simplified cross-sectional view of the central station concealed by a cover.

DESCRIPTION OF THE PREFERRED EMBODIMENT

Figure 1:
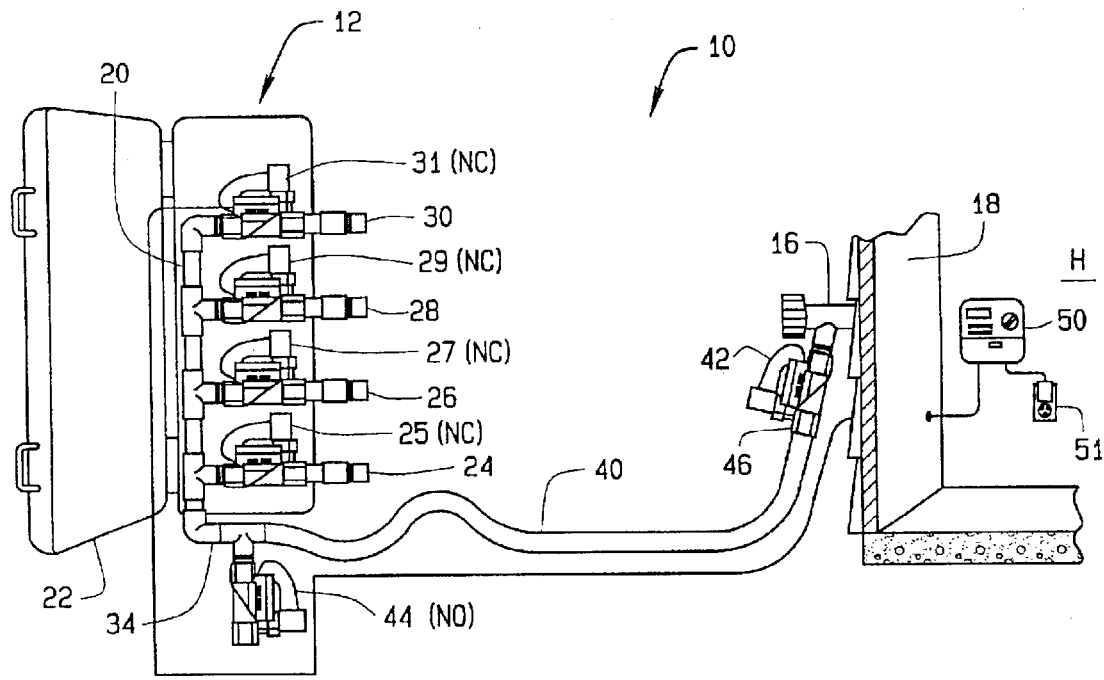
FIG. 1 shows a simplified arrangement of sprinkler system components.

Referring now by reference numerals to the drawings and FIGS. 1–5, in particular, it will be understood that the above ground sprinkler system generally indicated by numeral 10 includes a portable central station 12 supplied with water from a domestic water supply located in a building such as a house H and having at least one outlet or bib 16 in a wall 18.

The central station 12, in the embodiment shown, includes a manifold 20 mounted within a portable container 22 and having four outlets 24, 26, 28 and 30 each having an associated solenoid-operated central station flow control valve 25, 27, 29 and 31, respectively, which is normally closed when no power is supplied. Water is supplied to the manifold 20 through an inlet 34 connected by a flexible hose 40 to the bib 16, the hose 40 providing a main supply line.

In the arrangement shown, the flexible hose 40 includes a normally closed main solenoid-operated valve 42 at the bib end and a normally open solenoid-operated relief valve 44 at the manifold end. Preferably, a backflow preventer valve 46 is provided at the bib end downstream of the solenoid-operated valve 42 which may be connected directly to the valve 42 outlet.

The solenoid-operated valves are controlled by a control system, which includes a timer 50 supplied with 24 v power which, in the embodiment shown, is supplied from a transformer 51 connected to a conventional 120 v outlet but which could also be supplied from a battery source (not shown) as a backup.

In the embodiment shown in FIGS. 1–5, the timer 50 is arranged to actuate normally closed solenoid-operated valves 25, 27, 29 and 31 in sequence so that water is supplied to the associated outlets 24, 26, 28 and 30 at predetermined intervals for desired periods of time. When this is done, water is supplied to each hose 1–4 and each related sprinkler head S1–S4 at full pressure for a predetermined time period.

It will be understood that the timer 50 also controls the opening and closing of the solenoid-operated valves 42 and 44. These two valves are actuated when any one of the valves 25, 27, 29 or 31 is actuated. Solenoid-operated valve 42 is normally closed and opens to admit water into the flexible hose 40 when the control system timer 50 supplies power through line 52, which includes a common ground (not shown), going to all valves, and includes lines 54–59 going to individual valves. Solenoid-operated valve 44 is normally open and closes when the timer 50 supplies power through lines 52 and 55. When valve 44 is closed, water flow via the manifold 20 is only passed through valves 25, 27, 29 or 31 as sequenced.

In the embodiment described, the solenoid-operated valves manufactured by Orbit Irrigation Products, Inc. of North Salt Lake, Utah under the trademark WATERMASTER® Series No. 57100, 57300 and 57400 has proven satisfactory for valves 25, 27, 29, 31 or 42. Valve 44 is a modified version of the same valve.

Figure 6:
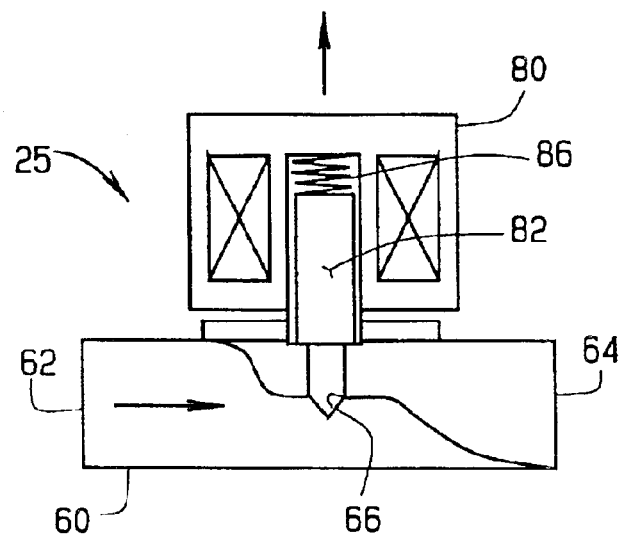
FIG. 6 is a schematic of a normally closed solenoid-operated valve.
Figure 7:
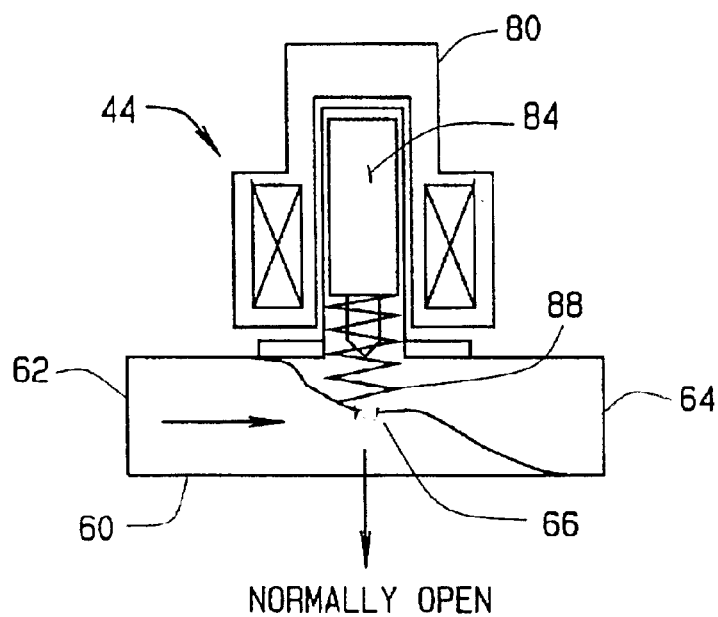
FIG. 7 is a schematic of a normally open solenoid-operated valve.

The normally closed solenoid-operated valves exemplified by valve 25, 27, 29 and 31 are shown in FIG. 6 and normally open solenoid-operated valve 44 is shown in FIG. 7. The basic features of both valves are the same Each valve includes a body assembly 60 having an inlet passage 62, an outlet passage 64 and a main flow passage having a valve port 66. Also provided are a diaphragm assembly (not shown), and a solenoid assembly 80. In the case of the normally closed valve a solenoid plunger 82 is provided (FIG. 6) and in the case of the normally open valve a solenoid plunger 84 (FIG. 7) is provided.

Flow control is achieved by applying a voltage to the solenoid coil thus creating a magnetic field that repositions the solenoid coil plunger. In FIGS. 6 and 7, it will be understood that the solenoid coil plunger either directly opens or closes the port. Alternatively, as well understood by those skilled in the art, the plunger opens or closes a pilot port (not shown). The opening or closing of a pilot port affects a pressure balance on a diaphragm or piston that causes an opening or closing of the main valve port.

A solenoid valve can be designed to allow flow when a voltage is applied and to stop flow when voltage is removed. This is a normally closed valve design shown in FIG. 6. A solenoid valve can also be designed to allow flow when voltage is removed and to stop flow when voltage is applied. This is a normally open valve design. The solenoid coil plunger and/or pilot port are located to achieve either a normally closed or normally open valve arrangement. The normally closed valve in FIG. 6 and the normally open valve in FIG. 7 are identical except that the solenoid coil plunger in FIG. 6 is positioned to the underside of the solenoid coil when a voltage is not applied and the solenoid coil plunger in FIG. 7 is positioned to the upper side of the solenoid coil when a voltage is not applied.

In the case of the normally closed valve shown in FIG. 6, the plunger is arranged so that energizing the coil will move the plunger up. A spring 86 may be used to maintain the plunger in the down position when the coil is de-energized. In the case of the normally open valve, the plunger is located so that energizing the coil will move the plunger down to close the valve. In this case, a spring 88 may be used to maintain the plunger in up position when the coil is de-energized.

Figure 8:
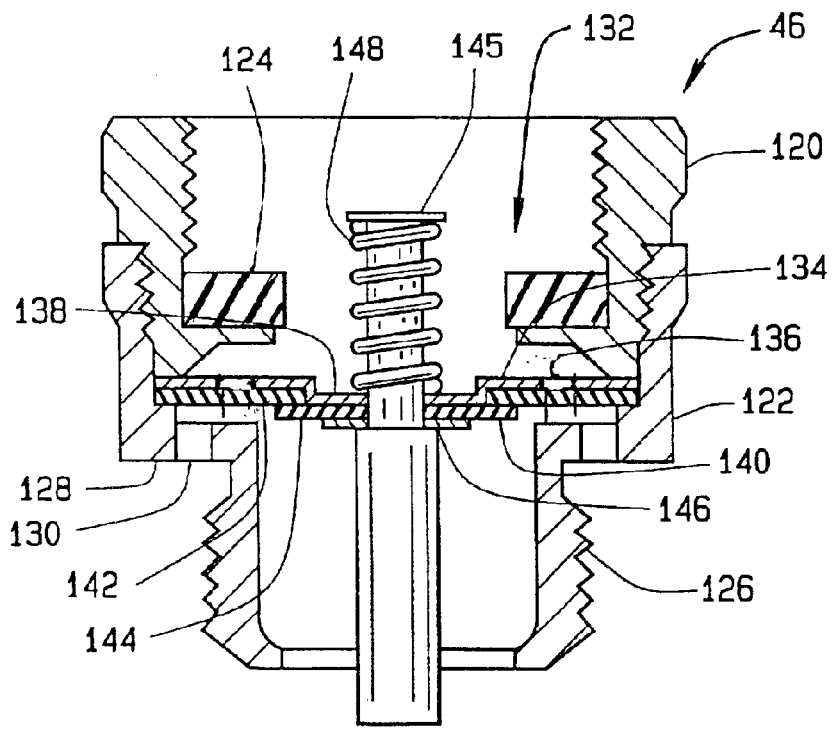
FIG. 8 is a cross-sectional view through a backflow preventer valve.

The backflow preventer valve 46 is used to prevent backflow siphoning into the water supply and a backflow preventer which may be used in the present embodiment is shown in FIG. 8. A suitable backflow preventer is manufactured by Watts Industries, Inc. of Andover, Mass. under Model No. 8. A backflow preventer of this type is disclosed in U.S. Pat. No. 3,171,423 which is incorporated herein by reference.

As shown in FIG. 8, the backflow preventer 46 includes threadedly connectible upper and lower body portions 120 and 122. The upper body portion 120 is threadedly connectible to the male outlet of the solenoid-operated main valve 42 at its upper end and the lower body portion 122 is threadedly connectible to female inlet of hose 40. The upper body portion 120 includes an annular abutment for receiving a rubber hose washer 124. The lower body portion 122 includes a reduced diameter nozzle portion 126 and an annular shoulder 128 having a plurality of circumferentially arranged evacuation openings 130.

A diaphragm assembly 132 is held between the upper and lower body portions 120 and 122. The diaphragm assembly 132 includes an upper metal washer 134, having a plurality of openings 136 and a depressed center portion 138, and a lower metal washer 140. Sandwiched between the two metal washers 134 and 140 are an upper flexible washer 142 and a lower flexible washer 144 providing overlapping diaphragm portions. A spring loaded central rod 145 carries the diaphragm assembly, the rod including a shoulder 146 seating the diaphragm assembly 132 and a spring 148, which extends between the upper metal washer 134 and an upper coined end of the rod 145.

When flow is in the normal downward direction, the diaphragm assembly 132 moves downwardly and the upper washer 142 flexes to seal off the openings 130. The spring around the rod compresses and the lower washer 142 separates from the upper washer 144 and a flow path is created through openings 136 in the upper metal washer and between the two flexible washers 142 and 144. The lower flexible washer wraps around the lower metal washer 144 which increases the flow area.

When flow is cut off the diaphragm assembly 132 returns upwardly under spring pressure to the position shown in FIG. 8 and any water moving in the opposite direction tends to increase the seal between the flexible washers. Upward flow is directed from an axial direction through 180° to the evacuation openings 130.

Figure 3:
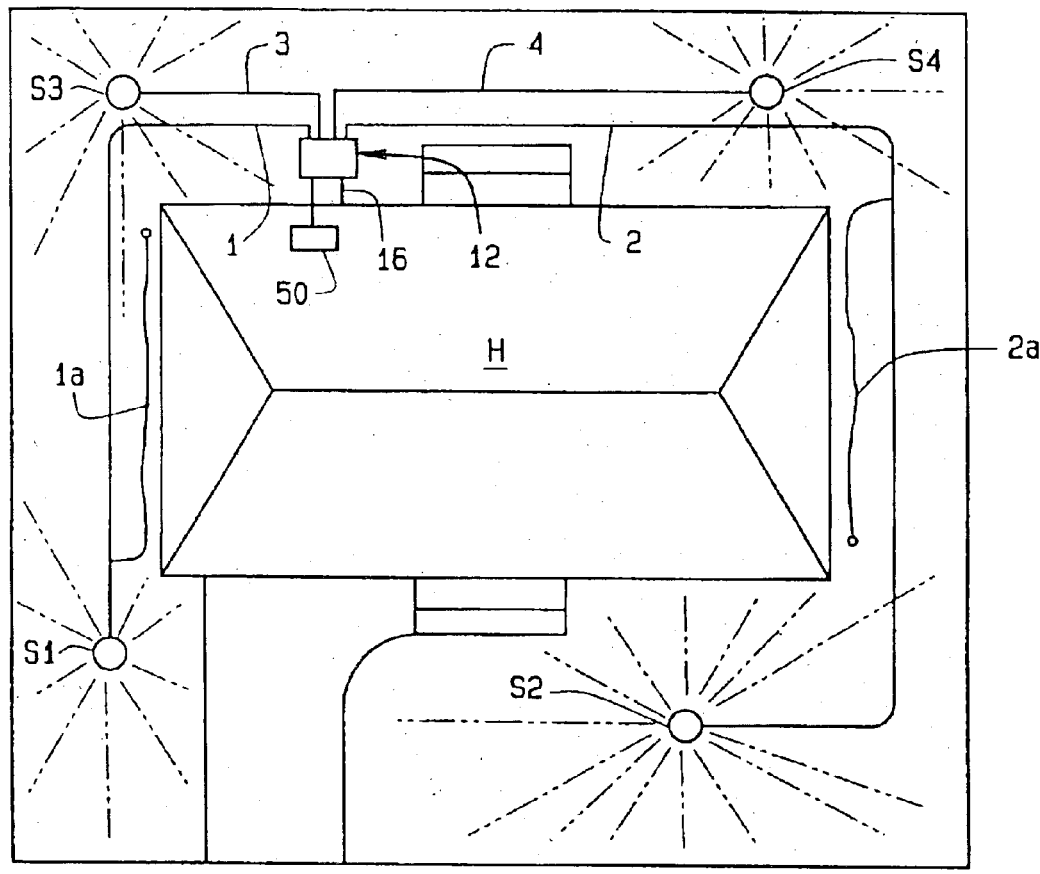
FIG. 3 is a plan view of a typical sprinkler system having four sprinkler outlets in parallel.

A sprinkler hose arrangement is shown in FIG. 3 in use with a typical dwelling house H. However, it will be understood that the system can also be used in conjunction with commercial buildings if desired. As shown in FIG. 3, hoses 1, 2, 3 and 4 are connected, respectively, to each of the four outlets 24, 26, 28 and 30 of the central station 12 which is connected to the bib 16 of the house water supply by main supply hose 40. The output from the central station 12 is controlled by the timer 50, which preferably is located inside the house H. Each hose 1, 2, 3 and 4 may be provided at its end with a sprinkler head S1, S2, S3 and S4, respectively. The sprinkler heads, or hose end sprinklers, may be varied to suit the requirements of the user. For example, they may include an impact sprinkler; an oscillating sprinkler; a stationary sprinkler or a rotary sprinkler, all of which are familiar to gardeners. In addition, and by way of example, a drip hose assembly 1*a* may be tee-connected to hose 1 and a soaker hose assembly 2*a* may be tee-connected to hose 2.

Figure 4:
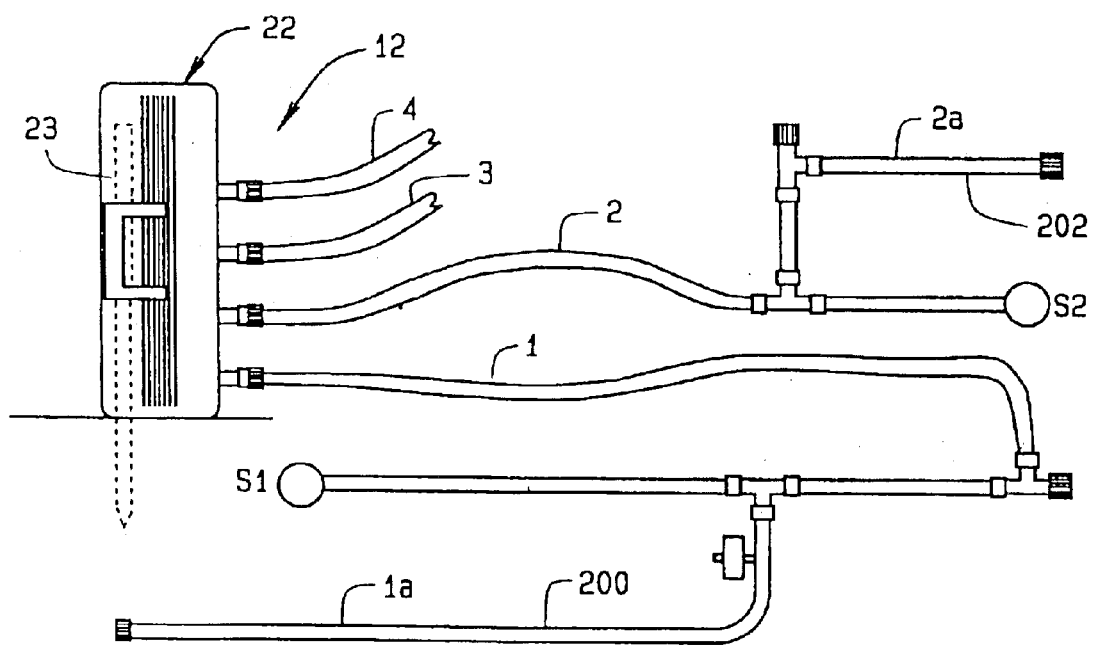
FIG. 4 is a more detailed view of the central station and illustrates a specific arrangement.

FIG. 4 shows the carrying case 22 in use in the closed, upright position, in which it is supported by a stake 23 and, by way of hoses 1 and 2, is used to provide drip hose watering through drip hose 200 and soaker hose watering through soaker hose 202 in addition to sprinkling heads S1 and S2. Straight couplings, tee couplings and end caps may be provided as required.

It is desirable in some instances to conceal the central station container 12 under a cover which simulates a natural object such as a rock. FIG. 11 illustrates a hollow plastic cover 15 for the container 12 shown in a horizontal condition and having openings 17 to receive the hoses 1–4. It will be understood that the container can be dispensed with if desired and the manifold 20 be concealed by the cover 15.

Figure 5:
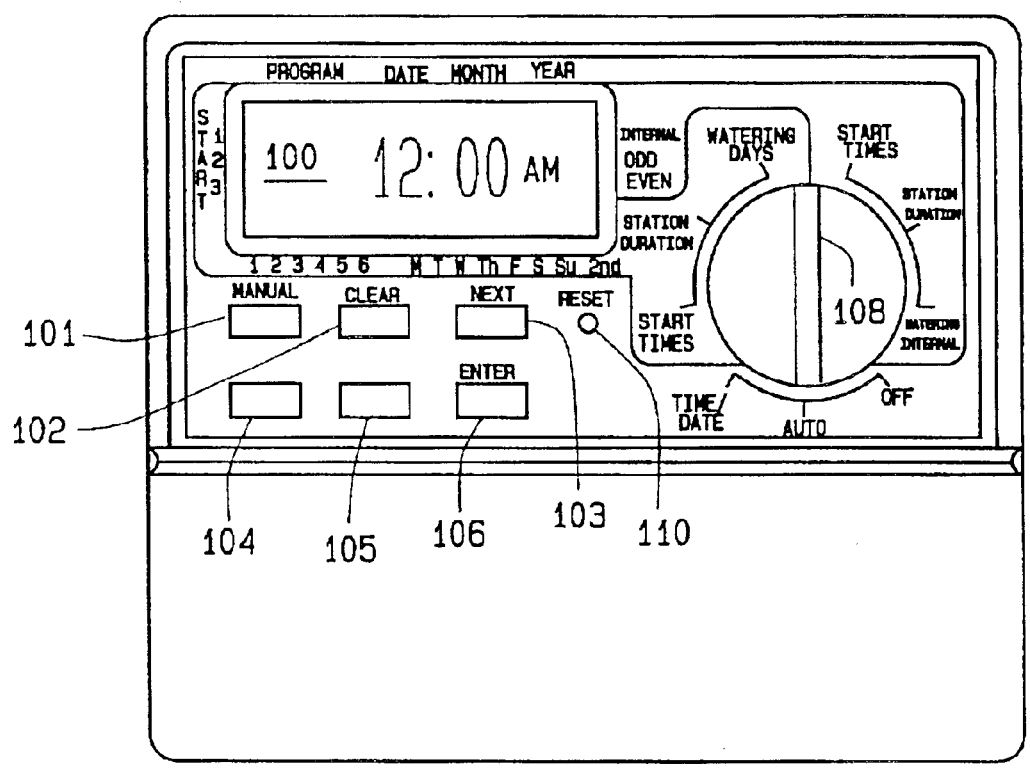
FIG. 5 is an elevational view of a typical timer.

The timer 50 is shown in FIG. 5 and the normally open solenoid-operated valves 25, 27, 29, 31 and 42 are shown in FIG. 6. Normally closed solenoid-operated valve 44 is shown in FIG. 7. The timer 50, as shown in FIG. 1, is located in a remotely located central station 12, for example in the basement of a house, but it could also be located in the case 22.

In the embodiment described, a timer 50 of the type supplied by Orbit Sprinkler Company of Bountiful, Utah under the trademark WATERMASTER® Series 57160, 57161, 57162, 57164, 57481 and WT2D has proven satisfactory.

As shown in FIG. 5, this timer 50 includes a liquid crystal display (LCD) 100 that shows the time of day and various program settings associated with watering programs executed by the timer. Six push button keys 101–106 allow for user setup and entry of various parameters associated with each program. A dial-type rotary selector 108 allows the user to select various functions and/or modes of operation associated with the timer. Based upon the positioning of the rotary selector 108 and data input by the user via the push button keys 101–106 and shown on the display 100, the user can set the time of day, the date, watering time duration, days on which watering is desired, start times and other functions. A reset button 110 is provided to clear all user-programmed parameters and reinstate default parameters associated with a factory-installed fail-safe program.

The timer 50 runs one or more watering programs based upon the specific watering needs and preferences of the user. In the preferred embodiment, the timer 50 includes a factory installed fail-safe program and two user-defined programs (program A and program B discussed below). The factory installed fail-safe program waters every station in sequence every day for 10 minutes in the preferred embodiment. This program runs automatically if the timer 50 loses AC power by way of battery backup power. The timer also allows for convenient and flexible watering schedules based upon user-defined programs. These user-defined watering programs allow for selective control of water dispersion from the water stations based upon the watering requirements for each station. For example, the timer allows for watering of each station for a predetermined time duration ranging from one (1) minute to ninety-nine (99) minutes. The timer also can be set to cycle each watering program up to four times per day. The timer provides for multiple schedule options, namely, weekly, every day, 1 to 28 days, and an option for odd and even days.

More specifically, the timer 50 of the preferred embodiment includes two user-defined programs, namely, program A and program B. Depending upon particular watering needs, the user can employ either or both programs A and B. In both programs A and B, the user inputs a watering schedule by setting the following parameters: (1) at least one start time using the + or − keys 104 and 105, respectively, when the rotary selector 108 is turned to the Set Start Time position; and (2) a watering duration ranging from one (1) to ninety-nine (99) minutes for each watering station using the + and − keys 104, 105 when the rotary selector 108 is turned to the Station/Duration position in either the A or B program.

Program A also allows the user to assign watering days by turning the rotary selector 108 to Watering Days in program A and then selecting from the display 100 either specific days of the week (i.e., any or all days in one week) or every second day for watering. Program A repeats continuously on a weekly basis.

Program B allows the user to water at intervals between days 1 to 28, or on odd or even days only based upon the date and time of day as previously programmed by the user. In this program, the user turns the selector 108 to the Watering Interval position and uses the + and − keys 104,105 to select the number of days between watering or to select either even or odd days.

After setting parameters for programs A and B, the timer 50 can be set for a fully automatic, semi-automatic or manual mode of operation. In the fully automatic mode, each program operates sequentially, starting with program A. In the semi-automatic mode, all watering stations cycle once based upon water durations entered for both the A and B programs or based upon water durations entered in either the A or B programs. In the manual operation mode, the user can set the watering durations in any of the programs' six stations for one (1) to ninety-nine (99) minutes.

The timer 50 also includes an inhibit mode that stops automatic watering for a predefined time (preferably 24 hours). After this interruption, the timer returns to its initial watering schedule. This feature allows the user to easily override the programming in the event of rain.

Figure 2:
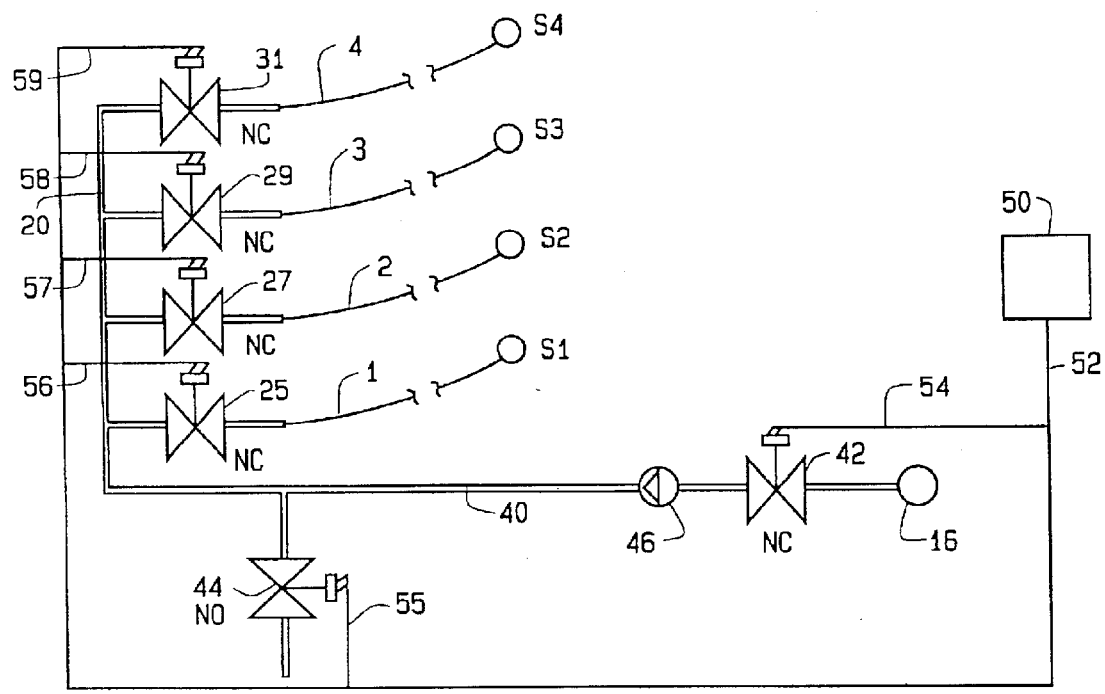
FIG. 2 is a schematic view of the electro-hydraulic circuitry.

A modified arrangement of flow control and relief valves is shown in FIG. 9. In this arrangement, the separate normally open relief valve 44, shown in FIGS. 1 and 2, is eliminated and the normally closed flow control valve 25 is substituted by a normally open solenoid-operated valve 25' which is used as a relief valve. The other central station flow control valves 27, 29 and 31 remain unchanged as a normally closed solenoid-operated valves. The main flow control valve 42 is unchanged as a normally closed solenoid-operated valve. With this arrangement, when the system is operational for watering the main normally closed flow control valve 42 is energized into the open condition, the normally open relief valve 25' is energized into the closed condition and the normally closed flow control valves 27, 29 and 31 are energized sequentially into the open condition. When the system is not operational for watering, the main flow control valve 42 is closed and the flow control valves 27, 29 and 31 return to their normally closed condition and the relief valve 25' is open to provide a drainage function.

Another modified arrangement of flow control and relief valves is shown in FIG. 10. This arrangement is similar to that shown in FIG. 9 in that the normally open separate relief valve 44 is eliminated. It is distinguished from the arrangement shown in FIG. 9 in that all of the central station flow control valves 25, 27, 29 and 31 are substituted by normally open valves 25', 27', 29', and 31' and all of these valves are used as relief valves. The main flow control valve 42 is unchanged and is a normally closed solenoid-operated valve. All other components not shown remain the same. With this arrangement, when the system is operational for watering the main normally closed flow control valve 42 is energized into the open condition, the normally open relief valves 25', 27', 29', and 31' are sequentially de-energized into the open condition for watering and those not called upon for watering are energized into the closed condition. When the system is not operational for watering, the main flow control valve 42 is closed and the flow control valves 25', 27', 29', and 31' are de-energized into the open condition to provide relief valves for drainage. A reverse system can also be used in which the normally open relief valve 25' is closed and the normally open flow control valves 27', 29', and 31' are energized and de-energized sequentially for watering. When the system is not operational for watering, all of the normally open central station valves are de-energized as is dedicated relief valves 25'.

Although the invention has been described by making detailed reference to preferred embodiments, such detail is to be understood in an instructive rather than in any restrictive sense, many other variants being possible within the scope of the claims hereunto appended.

I claim as my invention:

1. An above ground sprinkler system for a water supply comprising:
   a main supply hose with a main flow control valve, said hose having an inlet operatively connected to the water supply and an outlet;
   a central station including a water supply inlet operatively connected to the main supply hose outlet and a plurality of hose outlets, each having an associated flow control valve;
   control means for directing the water supply to the individual hose outlets and including a timer; and
   valve means including a dedicated solenoid-operated relief valve for venting and draining the main supply hose when the main flow control valve is closed.

2. A sprinkler system as defined in claim 1, wherein the valve means includes a backflow prevention valve for preventing backflow siphonage into the water supply.

3. A sprinkler system as defined in claim 1, wherein:
   the central station includes a portable container housing the flow control valves.

4. A sprinkler system as defined in claim 3, wherein:
   the timer is housed in the portable container.

5. A sprinkler system as defined in claim 1, wherein:
   a 24 volt power supply provides power for the solenoid-operated valves.

6. A sprinkler system as defined in claim 5, wherein:
   the relief valve is a normally open valve and supplying power to any of the normally closed valves energizes the normally open relief valve.

7. A sprinkler system as defined in claim 1, wherein:
   the timer is remotely located from the central station.

8. A sprinkler system as defined in claim 1, wherein:
   the central station includes a cover simulating a natural object.

9. An above ground sprinkler system for a water supply comprising;
   a main supply hose with a flow control valve, said hose having an inlet operatively connected to the water supply and an outlet;
   a central station including a water supply inlet operatively connected to the main supply hose outlet and a plurality of hose outlets, each having an associated flow control valve; and
   control means for directing the water supply to the individual hose outlets and including a timer; and
   valve means including a relief valve for draining the main supply hose,
   the flow control valves including the main flow control valve being normally closed, solenoid-operated valves; and the relief valve being a normally open solenoid-operated valve.

10. An above ground sprinkler system for a water supply comprising:
    a main solenoid-operated flow control valve having an inlet operatively connected to the water supply and an outlet;
    a main supply hose having an inlet operatively connected to the main valve outlet and an outlet;
    a backflow prevention assembly having an inlet operatively connected to one of said outlets and an outlet;
    a central station including a water supply inlet operatively connected to the main supply hose outlet and a plurality of hose outlets, each having an associated solenoid-operated flow control valve;
    control means for directing the water supply to the individual hose outlets and including a timer; and
    a dedicated solenoid-operated relief valve means for venting and draining the main supply hose when the main flow control valve is closed.

11. A sprinkler system as defined in claim 10, wherein:
    the main flow control valve is normally closed and at least one flow control valve in the central station is normally open to perform the function of the relief valve.

12. A sprinkler system as defined in claim 11, wherein:

all solenoid-operated valves are energized except one of the central station flow control valves, which is sequentially de-energized for demand watering, as controlled by the timer and all solenoid-operated valves are de-energized when watering is not required, as controlled by the timer.

13. A sprinkler system as defined in claim 10, wherein:

the main flow control valve is normally closed and all other flow control valves and the relief valve are normally open.

14. An above ground sprinkler system for a water supply comprising:

a main solenoid-operated flow control valve having an inlet operatively connected to the water supply and an outlet;

a main supply hose having an inlet operatively connected to the main valve outlet and an outlet;

a backflow prevention assembly having an inlet operatively connected to one of said outlets and an outlet;

a central station including a water supply inlet operatively connected to the main supply hose outlet and a plurality of hose outlets, each having an associated solenoid-operated flow control valve;

control means for directing the water supply to the individual hose outlets and including a timer; and a solenoid-operated relief valve means for venting and draining the main supply hose:

all flow control valves being normally closed and the relief valve being normally open to relieve pressure and discharge the water supply line.

15. A sprinkler system as defined in claim 14, wherein:

the main flow control valve and the relief valve are energized simultaneously while the central station flow control valves are energized sequentially for normal demand watering, as controlled by the timer and all solenoid-operated valves are de-energized when watering is not required, as controlled by the timer.

16. A sprinkler system as defined in claim 14, wherein:

each solenoid-operated valve includes a plunger; and the plunger positioning of the normally closed and normally open valves is arranged to insure that the main supply hose is pressure relieved and evacuated to prevent back-siphonage in the event of power failure occurrence during system operation.

17. An above ground sprinkler system for a water supply comprising:

a main supply hose with a main flow control valve, said hose having an inlet operatively connected to the water supply and an outlet;

a plurality of hose outlets operatively connected to the main supply hose, each having an associated flow control valve;

control means for directing the water supply to the individual hose outlets and the main supply hose and including a timer;

said main control valve and said hose outlet flow control valves and a solenoid-operated, dedicated relief valve providing a combination of normally open or normally closed valves, said timer selectively energizing said valves to provide sequential watering by the flow control valves and to provide selective venting and draining of the main supply hose.

18. An above ground sprinkler system for a water supply comprising;

a main supply hose with a flow control valve, said hose having an inlet operatively connected to the water supply and an outlet;

a central station including a water supply inlet operatively connected to the main supply hose outlet and a plurality of hose outlets, each having an associated flow control valve; and control means for directing the water supply to the individual hose outlets and including a timer;

valve means including a relief valve for draining the main supply hose, the relief valve being a normally open valve, and supplying power to any of the normally closed valves energizes the normally open relief valve.

* * * * *